(12) United States Patent
Goda et al.

(10) Patent No.: US 6,964,690 B2
(45) Date of Patent: Nov. 15, 2005

(54) SAFETY MECHANISM FOR RECTANGULAR BATTERY AND METHOD OF MANUFACTURING THE SAME

(75) Inventors: Yoshio Goda, Yao (JP); Tadahiro Tokumoto, Hirakata (JP); Ryuichiro Ebi, Osaka (JP); Tomomichi Ueda, Osaka (JP); Masanori Makino, Daito (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 390 days.

(21) Appl. No.: 10/204,197

(22) PCT Filed: Feb. 19, 2001

(86) PCT No.: PCT/JP01/01181

§ 371 (c)(1),
(2), (4) Date: Sep. 5, 2002

(87) PCT Pub. No.: WO01/61770

PCT Pub. Date: Aug. 23, 2001

(65) Prior Publication Data

US 2003/0077505 A1    Apr. 24, 2003

(30) Foreign Application Priority Data

Feb. 18, 2000 (JP) ............................. 2000-041239
Jun. 23, 2000 (JP) ............................. 2000-188809

(51) Int. Cl.[7] ............................................. H01M 2/12
(52) U.S. Cl. ....................... 29/623.1; 429/53; 429/56
(58) Field of Search ............................ 429/53–56, 82; 29/623.1; 220/89.1, 89.2; 137/68.27

(56) References Cited

U.S. PATENT DOCUMENTS

| 4,722,874 A | * | 2/1988 | Marchak .................. 429/56 |
| 6,159,631 A | * | 12/2000 | Thompson et al. ......... 429/82 |
| 6,432,572 B1 | * | 8/2002 | Yoshida et al. ............. 429/56 |

FOREIGN PATENT DOCUMENTS

| JP | 08148184 A | * | 6/1996 | .......... H01M 10/40 |
| JP | 09-320549 | | 12/1997 | |
| JP | 10-092397 | | 4/1998 | |
| JP | 10-269997 | | 10/1998 | |
| JP | 11-185714 | | 7/1999 | |
| JP | 11-213978 | | 8/1999 | |
| JP | 2000182588 A | * | 6/2000 | .......... H01M 2/12 |
| JP | 2001-035467 | | 2/2001 | |
| JP | 2001143664 A | * | 5/2001 | .......... H01M 2/02 |

* cited by examiner

Primary Examiner—Gregg Cantelmo
(74) Attorney, Agent, or Firm—Jordan and Hamburg LLP

(57) ABSTRACT

A battery case (1) has a cutting groove (10) formed on its elongated side surface (1a). Between a groove bottom surface of the cutting groove (10) and an inner surface of the battery case (1) is provided a thin-walled easily-rupturable portion (12) designed to rupture at an instant when an internal pressure of the battery case (1) reaches a predetermined value. Thereby, a safety mechanism for use with a prismatic battery is realized. The manufacture of the safety mechanism is as follows. A cutting blade (37) rotated at a high speed by a high-speed rotary body (30) is brought into cutting engagement with the elongated side surface (1a) of the battery case (1) of the prismatic battery in finished form until it reaches a predetermined depth and is fixed, and subsequently the high-speed rotary body (30) or the prismatic battery is brought into rectilinear relative movement.

16 Claims, 8 Drawing Sheets

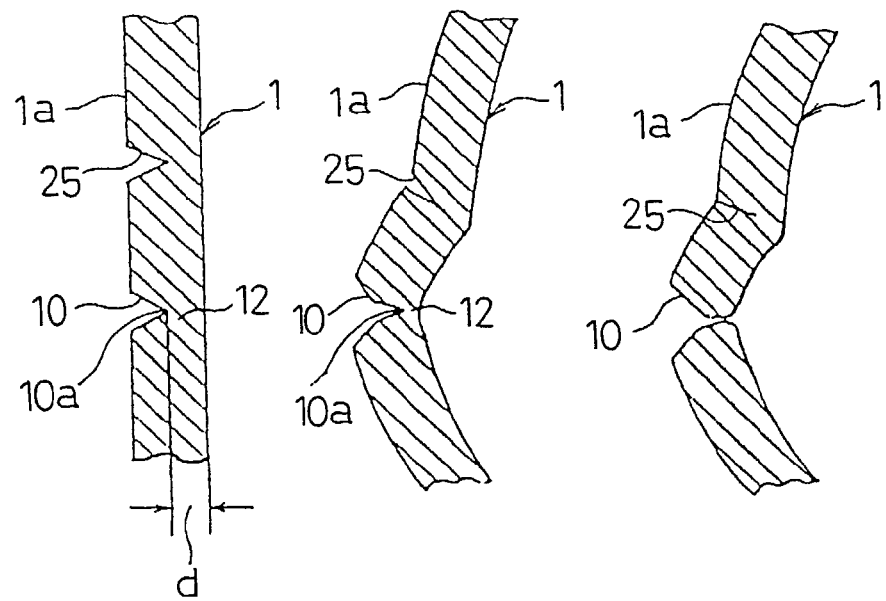
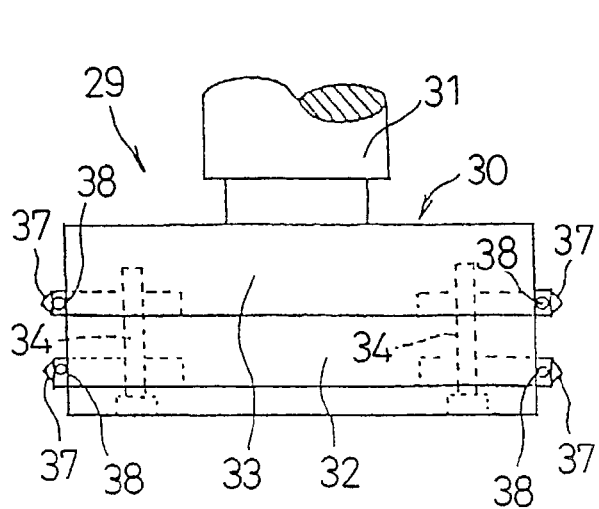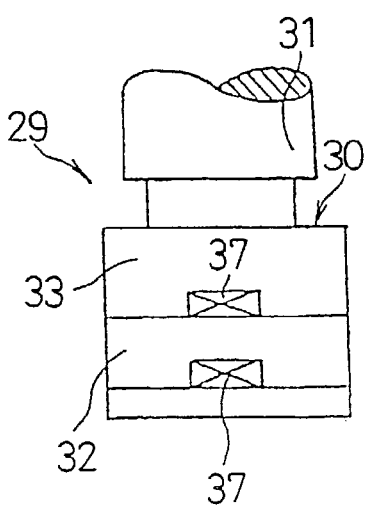

SAFETY MECHANISM FOR RECTANGULAR BATTERY AND METHOD OF MANUFACTURING THE SAME

TECHNICAL FIELD

The present invention relates to a safety mechanism that is incorporated in a prismatic battery having a power-generating element housed in a relatively flat battery case in the form of a rectangular prism, for performing degassing by opening a part of the battery case when the internal gas pressure rises abnormally. The invention also relates to a method for manufacturing the safety mechanism.

BACKGROUND ART

Rechargeable batteries for use as power sources in portable electronic equipment are required to have a high energy density and also required to have space efficient configuration in keeping with the demand for weight reduction and miniaturization in the electronic equipment. As a battery that satisfies these requirements, increasing attention has been paid to a prismatic lithium rechargeable battery employing an aluminum-made, relatively flat battery case in the form of a rectangular prism. This lithium rechargeable battery has non-aqueous electrolyte (organic solvent-base electrolyte) contained in the battery case and is thus required to exhibit stable hermeticity for a longer period of time. Thus, in manufacturing the lithium rechargeable battery, after an electrode group is housed in the battery case in the form of a rectangular prism with a bottom, an opening of the battery case is sealed with a sealing plate by laser welding.

In a non-aqueous electrolyte rechargeable battery, like the lithium rechargeable battery described above, when it is overcharged, or a short circuit occurs due to wrong use and consequently the non-aqueous electrolyte is decomposed, gas is generated. The resultant gas fills inside the battery case hermetically sealed, and, if this causes the internal pressure of the battery to rise to a certain value or above, the battery case may possibly be ruptured. Non-aqueous electrolyte rechargeable batteries in particular are more susceptible to such a failure than batteries of other type.

In order to protect a battery case from rupture, there has conventionally been provided a safety mechanism whereby, when an internal pressure of the battery case exceeds a certain value, an opening is created in a part of the battery case by exploiting the pressure, and, through the resultant opening, the gas is discharged out of the battery case.

Examples of generally-known safety mechanisms for use with non-aqueous electrolyte rechargeable batteries are shown in FIGS. 11A to 11C. A first conventional safety mechanism shown in FIG. 11A is constructed as follows. In a battery case 1 in the form of a rectangular prism with a bottom, an aluminum-made sealing plate (which is 900 μm in thickness, for example) 2 is provided for sealing an upper-end opening of the battery case 1. The sealing plate 2 has a gas vent hole 3 formed in a part thereof. Moreover, an aluminum-made thin plate (which is 30 μm in thickness, for example) 4 is bonded to an under surface of the sealing plate 2 in a vacuum. In this construction, when an internal pressure of the battery case 1 rises to a certain value or above, a portion 4a of the thin plate 4 for covering the gas vent hole 3 is pressurized by the gas pressure and is thereby ruptured. As a result of the rupture of the thin plate 4, an opening is created, and, through the resultant opening and the gas vent hole 3, the internal gas is discharged out of the battery case 1.

A second conventional safety mechanism shown in FIG. 11B is constructed as follows. In a battery case 1 in the form of a rectangular prism with a bottom, a marking groove 7 is formed on one of elongated side surfaces 1a thereof. The marking groove 7 has a V-shaped section and appears circular when viewed from the plane. Between a groove bottom surface of the marking groove 7 and an inner surface of the battery case 1 is disposed a thin-walled and circular easily-rupturable portion 8. In this construction, when the internal pressure of the battery case 1 rises to a certain value or above, the easily-rupturable portion 8, which is lower in strength than the other portions of the elongated side surface 1a, is cleaved and opened. Through the resultant opening, the gas is discharged to the outside.

A third conventional safety mechanism shown in FIG. 11C is constructed as follows. On a bottom surface of a battery case 1 is formed a marking groove 9 which is composed of a linear portion parallel to a ridge line of the battery case 1, and V-shaped portions extending from both ends of the linear portion. In this construction, the marking groove 9 is formed on the bottom surface 1b, i.e. the minimum-area portion, of the battery case 1. Thus, when both of the elongated side surfaces 1a and 1c of the battery case 1 are expanded outwardly with a rise in the internal pressure, the bottom surface 1b is deformed inwardly, and whereby the marking groove 9 is cleaved and opened. Through the resultant opening, the gas is discharged to the outside.

However, the first safety mechanism requires a drilling process for forming the gas vent hole 3 in the relatively small sealing plate 2 having a rectangular shape, a process for activating one surface of the sealing plate 2 that becomes an inner surface when mounted in the battery case 1, and a vacuum adsorption process for combining the thin plate 4 with the activated surface by pressing using a roller. This leads to an undesirable increase in the manufacturing cost. Furthermore, since the gas vent hole 3 is formed in an end portion of the sealing plate 2 having a relatively small configuration, the action of the gas pressure required to rupture the portion 4a or covering the gas vent hole 3 is exerted only on a strictly localized region of the battery case 1 as a whole. This necessitates much time being spent in rupturing the portion 4a for covering the gas vent hole 3. To address this problem, conventionally, the thickness of the thin plate 4 has been reduced from 30 μm to 20 μm in an attempt to rupture the thin plate 4 rapidly at the instant when the battery internal pressure reaches a predetermined value. However, reducing the thickness of the thin plate 4 creates another problem that the thin plate 4 may possibly be ruptured by an impact caused by drop tests.

Moreover, in the second safety mechanism, the elongated side surface 1a, which has a thickness of approximately 300 μm, of the battery case 1 is subjected to press working using a punching die or the like to form the circular, wedge-like marking groove 7. Thereby, a remaining wall thickness of approximately 80 μm is obtained to form the easily-rupturable portion 8. In this case, thermal stress developed during the press working causes work hardening, with the result that, in the elongated side surface 1a, the physical properties of the periphery of the easily-rupturable portion 8 are varied. Since the degree of the change in the physical properties, that is, the degree of hardening and embrittling is not kept constant, it is impossible to set the battery internal pressure for the rupture of the easily-rupturable portion 8 at a fixed value. In addition, to prevent accidental intrusion of dust or dirt into the battery case 1, the marking groove 7 is formed in the battery case 1 with its opening temporarily sealed by the sealing plate. At this time, the sealing plate 2 is subjected to stress resulting from the flow of the material during the press working is conducted on the elongated side surface 1a having a relatively large area, and is thereby slightly opened with respect to the opening of the battery case 1. Thus, when the sealing plate 2 is fixed to the battery case 1 by laser welding, a blowhole is created. The resultant small hole tends to cause leakage of electrolyte.

Further, in the third safety mechanism, the marking groove 9 is formed on the bottom surface 1b, i.e. the minimum-area portion of the battery case 1. Thus, unlike the second safety mechanism, the third safety mechanism is free of such a problem that the sealing plate 2 is inconveniently opened during press working. However, since the marking groove 9 is formed by press working, as observed in the second safety mechanism, work hardening occurs during the press working and this causes the physical properties of the periphery of the marking groove 9 to change. Consequently, the battery internal pressure cannot be kept constant for the operation of the safety mechanism. In addition, the marking groove 9 is formed on the bottom surface 1b, i.e. the minimum-area portion of the battery case 1, which is resistant to deformation under a rising internal pressure. Thus, in order for the safety mechanism to operate at a predetermined battery internal pressure, the remaining wall thickness of the marking groove 9 needs to be kept as small as possible. The wall thickness needs to be controlled with high accuracy, and this leads to poor workability of the marking groove 9. What is worse, the remaining wall thickness of the groove bottom portion of the marking groove 9 is so small that the resistance to falling is extremely low. Further, another problem arises. In a case where the battery pack is constituted by placing a combination of a plurality of cells connected in series or parallel with one another in a pack case, formation of the marking groove 9 on the bottom surface 1b of the battery case 1 makes difficult connection of leads by welding.

The present invention has been made in light of the above stated problems with the conventional art, and accordingly it is an object of the present invention to provide a prismatic battery safety mechanism that, despite being constructed at lower cost, discharges gas out of a battery case properly and swiftly at an instant when a battery internal pressure reaches a predetermined value, and it is also an object of the invention to provide a method for easily manufacturing the safety mechanism while preventing occurrence of problems.

DISCLOSURE OF THE INVENTION

To achieve the above objects, according to one aspect of the present invention, there is provided a safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, the safety mechanism being characterized in that, on an elongated side surface of the battery case is formed a cutting groove, and between a groove bottom surface of the cutting groove and an inner surface of the battery case is provided a thin-walled easily-rupturable portion having a strength which is so set that the easily-rupturable portion is ruptured at an instant when the internal pressure of the battery reaches a predetermined value.

In this prismatic battery safety mechanism, the easily-rupturable portion, which is provided by using a remaining wall thickness of the groove bottom portion of the cutting groove, is formed on the elongated side surface, i.e. the wider-area part, of the battery case that is deformed greatly with a rise in the battery internal pressure. Consequently, the easily-rupturable portion is ruptured properly and swiftly at an instant when the battery internal pressure reaches a working pressure of the safety mechanism. Moreover, the cutting groove is formed by cutting work using a cutting blade or the like, instead of press working, and is thus free from work hardening resulting from thermal stress. Thus, the physical properties of the periphery of the cutting groove remain unchanged. Consequently, the working pressure of the safety mechanism, which is set in accordance with the wall thickness of the easily-rupturable portion, is controlled with high accuracy, so that the safety of the prismatic battery is improved.

According to another aspect of the present invention, there is provided a method of manufacturing a prismatic battery safety mechanism, including the steps of: fabricating a prismatic battery by housing an electrode plate and electrolyte in a battery case in the form of a rectangular prism having a bottom, and subsequently sealing an opening of the battery case; and forming a cutting groove on an elongated side surface of the battery case of the prismatic battery by bringing a cutting blade, which is attached to a high-speed rotary body so as to rotate at a high speed, into cutting engagement with the elongated side surface until it reaches such a depth as to form an easily-rupturable portion having a predetermined wall thickness and is then fixed in a relative position, and subsequently bringing the high-speed rotary body or the prismatic battery into rectilinear relative movement to rotate the cutting blade a number of times.

In this prismatic battery safety mechanism manufacturing method, the cutting groove is formed on the elongated side surface of the prismatic battery in finished form. This prevents accidental intrusion of dust or dirt produced during the formation of the cutting groove into the battery case. Moreover, since the cutting groove is formed by performing cutting work a number of times using the cutting blade rotating at a high speed, work hardening resulting from thermal stress never occurs. Thus, the working pressure of the safety mechanism is controlled with high accuracy, and it never occurs that the sealing plate is inconveniently opened with respect to the opening of the battery case because of stress resulting from the flow of the material during the working. Further, the cutting groove is formed by bringing the high-speed rotary body having a cutting blade attached thereto and the prismatic battery into rectilinear relative movement. Consequently, a cutting groove is formed with high accuracy that includes a linear groove bottom portion extending rectilinearly at an identical depth and two curved groove bottom portions extending curvedly from both ends of the linear groove bottom portion toward the outer surface of the battery case.

BRIEF DESCRIPTION OF THE DRAWINGS

FIGS. 4A to 4C are sectional right-hand side views of a prismatic battery furnished with the safety mechanism according to a second embodiment of the invention, illustrating a process of rupture of an easily-rupturable portion under a rising battery internal pressure step by step;

FIGS. 5A and 5B are respectively a front view and a right-hand side view illustrating a cutting apparatus for use in one embodiment of a method of manufacturing a prismatic battery safety mechanism according to the invention;

BEST MODE FOR CARRYING OUT THE INVENTION

Figure 1:
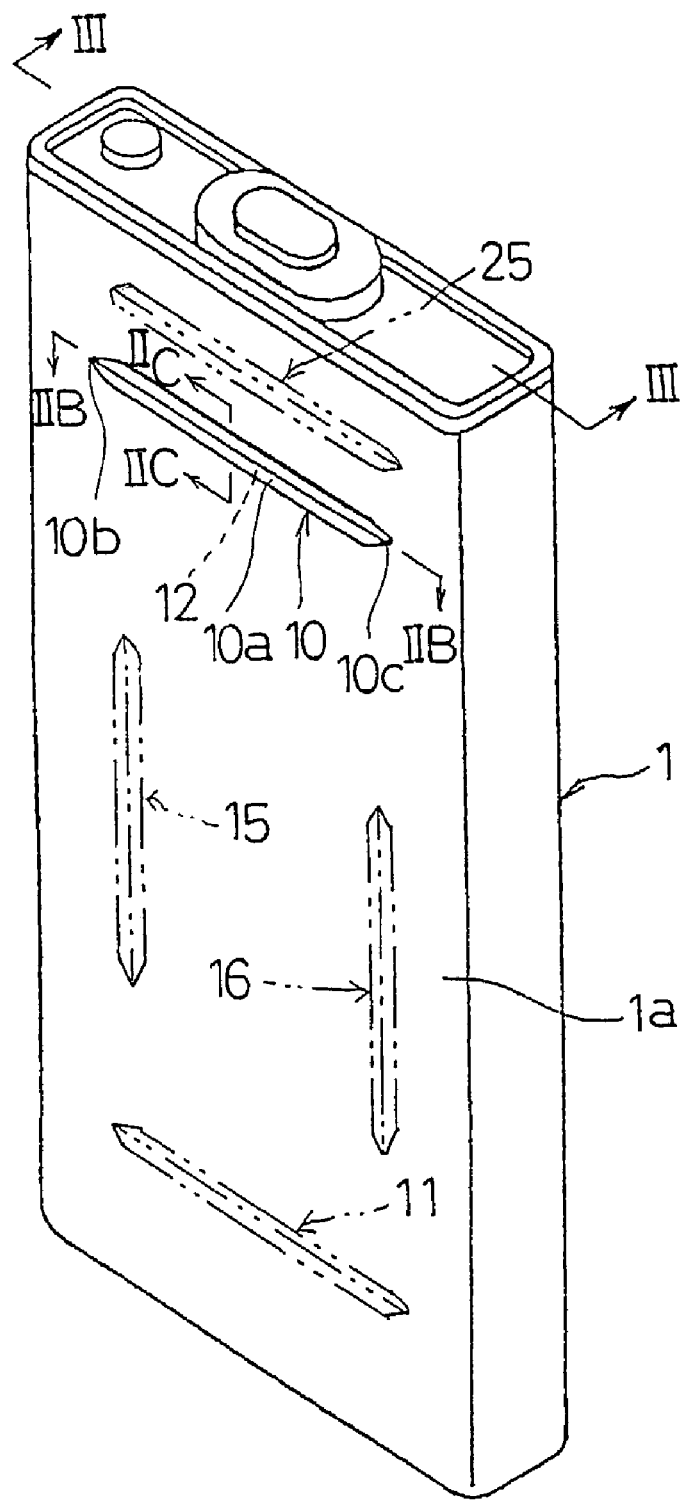
FIG. 1 is a perspective view illustrating a prismatic battery furnished with a safety mechanism according to a first embodiment of the present invention.
Figure 2A:
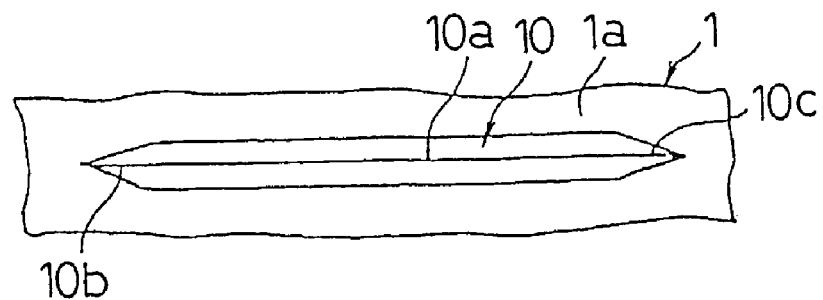
FIG. 2A is a front view of a part of the construction shown in FIG. 1 in which a cutting groove is formed.
Figure 2B:
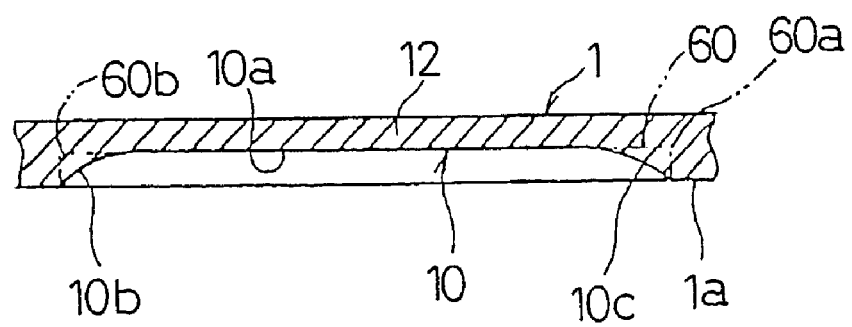
FIG. 2B is a sectional view taken along the line IIB—IIB of FIG. 1.
Figure 2C:
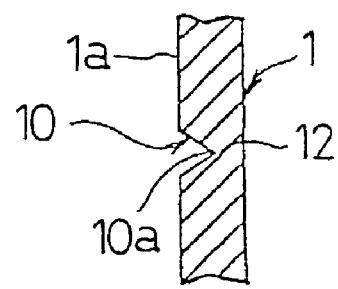
FIG. 2C is a sectional view taken along the line IIC—IIC of FIG. 1.

Hereinafter, preferred embodiments of the present invention will be described with reference to the accompanying drawings. FIG. 1 is a perspective view illustrating a prismatic battery furnished with the safety mechanism according to a first embodiment of the present invention; FIG. 2A is a front view of a part of the battery in which a cutting groove is formed; FIG. 2B is a sectional view taken along the line IIB—IIB of FIG. 1; and FIG. 2C is a sectional view taken along the line IIC—IIC of FIG. 1. In FIG. 1, a rectangular prism-shaped battery case 1 has, on one of its elongated side surfaces 1a, a single linear cutting groove 10 arranged parallel to upper and lower edges of the elongated side surface 1a. As shown in FIG. 2B, between a groove bottom of the cutting groove 10 and an inner surface of the battery case 1 is provided a thin-walled easily-rupturable portion 12 having a thickness which is so set that the easily-rupturable portion 12 is ruptured at an instant when the internal pressure of the battery case 1 rises to a predetermined value. In this embodiment, the easily-rupturable portion 12 is formed in the vicinity of the upper edge of the elongated side surface 1a of the battery case 1, more specifically, formed in one of three vertically-divided portions of the elongated side surface 1a that is closest to its upper edge. As shown in FIG. 2C, the cutting groove 10 has a substantially V-shaped section, as viewed in a width direction perpendicular to its length direction. Moreover, as shown in FIG. 2B explicitly, the cutting groove 10 has its lengthwise sectional profile composed of a combination of a linear groove bottom portion 10a extending rectilinearly at an identical depth, of which a remaining wall thickness of the groove bottom provides the easily-rupturable portion 12, and two curved groove bottom portions 10b and 10c extending curvedly from both ends of the linear groove bottom portion 10a toward the outer surface of the elongated side surface 1a of the battery case 1.

Figure 3:
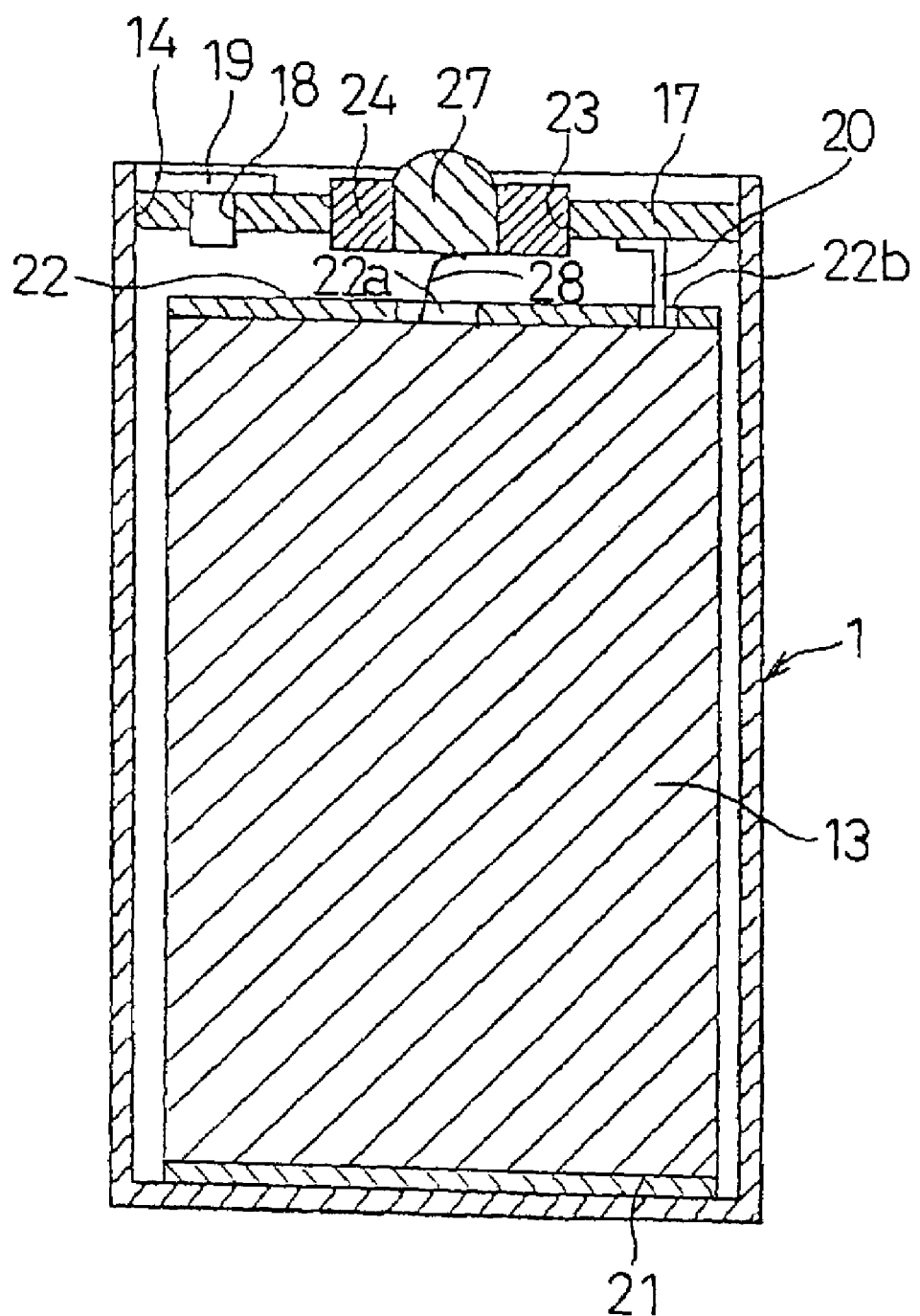
FIG. 3 is a sectional view taken along the line III—III of FIG. 1.

FIG. 3 is a sectional view taken along the line III—III of FIG. 1, illustrating a lithium ion rechargeable battery, as an example of prismatic batteries. Next, the structure of the lithium ion rechargeable battery will be briefly described. The lithium ion rechargeable battery has non-aqueous electrolyte (not shown) contained in the battery case 1 and is thus required to exhibit stable hermeticity for a longer period of time. Thus, in manufacturing the lithium ion rechargeable battery, after an electrode group 13 is housed in the battery case 1 in the form of a rectangular prism having a bottom, an opening 14 of the battery case 1 is sealed with a sealing plate 17 by laser welding. Thereafter, a predetermined amount of electrolyte is poured into the battery case 1 from an inlet hole 18 formed in the sealing plate 17. Lastly, the inlet hole 18 is sealed by a sealing member 19.

The battery case 1 is made of a metal plate such as an aluminum plate, a nickel-plated steel plate, a clad steel plate, or a stainless steel plate. Inside the battery case 1 is inserted the electrode group 13. The electrode group 13 has its lower-end portion electrically insulated and separated from an inner bottom surface of the battery case 1 by an insulating plate 21, and has its upper-end portion electrically insulated by an insulating plate 22.

The sealing plate 17 has, in a fitting hole 23 formed in its central part, a negative electrode terminal 27 that is electrically insulated therefrom via an insulating gasket 24. The negative electrode terminal 27 is, at its under surface, connected by welding to a negative electrode lead 28 that is delivered, through an insertion hole 22a of the insulating plate 22, from the electrode group 13. The sealing plate 17 is connected by welding to a positive electrode lead 20 that is delivered, through an insertion hole 22b of the insulating plate 22, from the electrode group 13. The assembly of the battery proceeds in the following steps. First, the sealing plate 17 is fitted in the opening 14 of the battery case 1 and is then fixed, at its periphery, to an inner circumferential surface of the battery case 1 by laser welding. Subsequently, a predetermined amount of electrolyte is poured through the inlet hole 18, and then the inlet hole 18 is sealed by the sealing member 19. Note that, whereas the sealing plate belonging to the first conventional safety mechanism includes the gas vent hole 3 and the thin plate 4, the sealing plate 17 includes only the inlet hole 18 and the fitting hole 23, and therefore is produced at lower cost.

Next, the working of the above-described safety mechanism will be described below. A battery internal pressure, i.e. a working pressure required for rupturing the easily-rupturable portion 12, is set in accordance with the wall thickness of the easily-rupturable portion 12. In a case where, for example, the prismatic battery in use is overcharged or suffers from a short circuit due to wrong use, gas is generated and fills inside the battery case 1, resulting in a rise in the battery internal pressure. As a result, the battery case 1 is expanded outwardly.

At this time, in the battery case 1, the central part of the elongated side surface 1a is wholly expanded outwardly. In the elongated side surface 1a, the portion closest to the cutting groove 10 equates a boundary portion between an expanded area and a barely-expanded area, and is thus defined as one of the regions that undergo the biggest stress-induced change. That is, in the cutting groove 10, whereas the upper portion, as viewed in a width direction perpendicular to its length direction, is expanded little when the battery internal pressure rises, the central portion, as viewed in the width direction, is expanded greatly. In other words, the cutting groove 10 is so deformed that its groove opening is opened widely with a rise in the battery internal pressure. This facilitates the rupture of the easily-rupturable portion 12 provided in the groove bottom portion of the cutting groove 10. Then, at the instant when the battery internal pressure rises to a predetermined working pressure level, the easily-rupturable portion 12 is ruptured by a shear force, thereby creating an opening. Through the resultant opening, the gas trapped inside the battery case 1 is discharged to the outside.

In this safety mechanism, the easily-rupturable portion 12 is formed on the elongated side surface 1a, i.e. the wider-area portion that is deformed greatly with a rise in the battery internal pressure, of the battery case 1. This arrangement allows the easily-rupturable portion 12 to be ruptured properly and swiftly at the instant when the battery internal pressure reaches a predetermined working pressure level. Thus, as compared with the conventional safety mechanisms, the easily-rupturable portion 12 is allowed to have a larger wall thickness, so that the resistance to falling is improved. Moreover, the accuracy is controlled with ease, so that the workability of the cutting groove 10 is improved.

Figure 11A:
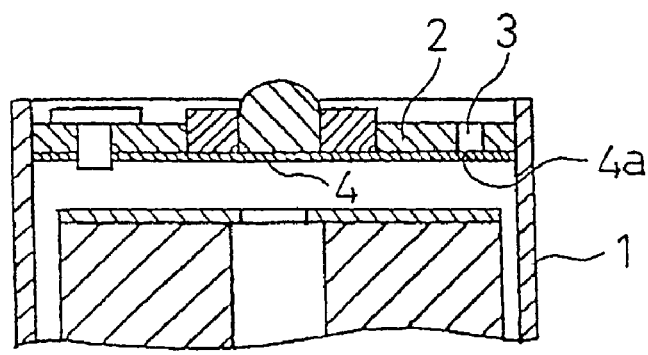
FIGS. 11A to 11C are cross-sectional views and a perspective view respectively illustrating a first conventional safety mechanism for a prismatic battery, a second conventional safety mechanism, and a third conventional safety mechanism.
Figure 11B:
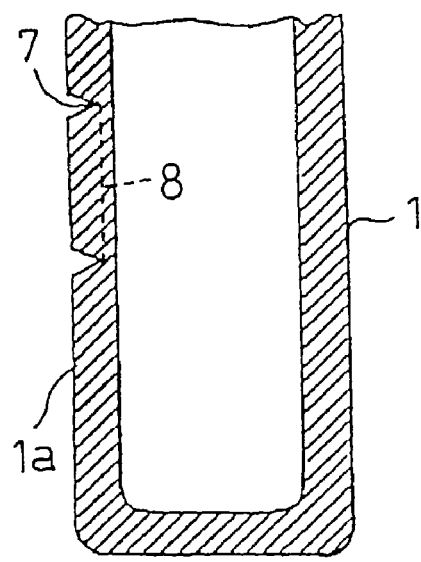
Figure 11C:
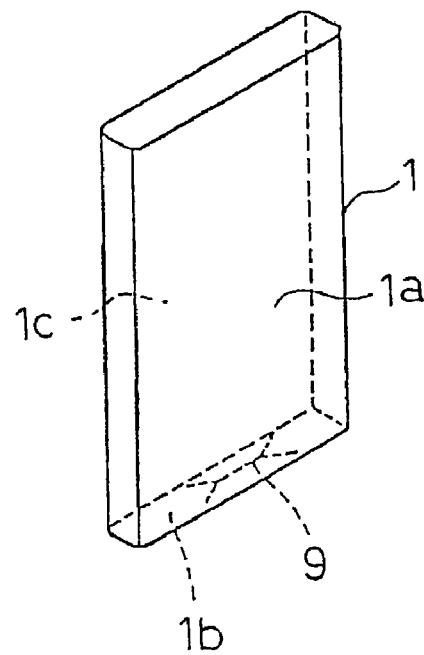

Further, as will be described later, the cutting groove 10 is, unlike the conventional marking grooves 7 and 9, formed by cutting work using a cutting blade or the like, and is thus free from work hardening resulting from thermal stress as observed in press working. Accordingly, the physical properties of the periphery of the cutting groove 10 remain unchanged. This makes it possible to set the working pressure of the safety mechanism in accordance with the wall thickness of the easily-rupturable portion 12 with high accuracy, so that the safety of the prismatic battery is significantly improved. Still further, the cutting groove 10 is formed on the elongated side surface 1a having a relatively wide area and is nevertheless provided by cutting work that causes no compression in the wall thickness of the material. This prevents occurrence of stress-induced deformation resulting from the flow of the material during the working. Thus, even in a case where the cutting groove 10 is formed in the battery case 1 with its opening 14 temporarily sealed by the sealing plate 17, it is unlikely that the sealing plate 17 is opened with respect to the opening 14 of the battery case 1. Consequently, leakage of the electrolyte is prevented. Moreover, this safety mechanism is composed solely of a single cutting groove 10, and thus requires a smaller number of process steps and less manufacturing cost than in the conventional safety mechanism shown in FIG. 11A in which the sealing plate 2 with the gas vent hole 3 has the thin plate 4 bonded to the under surface thereof.

In addition, the cutting groove 10 has a configuration composed of a combination of the linear groove bottom portion 10a extending rectilinearly at an identical depth whose groove bottom provides the easily-rupturable portion 12, and the two curved groove bottom portions 10b and 10c extending curvedly from both ends of the linear groove bottom portion 10a toward the outer surface of the battery case 1. Thus, at the instant when the battery internal pressure reaches a predetermined value, the easily-rupturable portion 12, provided by using the remaining wall thickness of the linear groove bottom portion 10a in the cutting groove 10, is ruptured properly. By contrast, as indicated by a dash-dot-dot line in FIG. 2B, in a case of providing a cutting groove 60 having a rectangular lengthwise section, when the battery case 1 is expanded outwardly with a rise in the battery internal pressure, there arises a possibility that corner portions 60a and 60b at both ends of the groove bottom portion are ruptured earlier. This may lead to a problem that the easily-rupturable portion 12 is inconveniently ruptured before the battery internal pressure reaches a predetermined working pressure level.

The safety mechanism constituted by the cutting groove 10 having the above-described configuration also presents the following advantage. That is, the cutting groove 10 has a substantially V-shaped section when viewed in a width direction perpendicular to its length direction. Thus, the easily-rupturable portion 12 is set in the area between the substantially rectilinear groove bottom portion of the cutting groove 10 and the inner surface of the battery case 1. This arrangement facilitates the setting of the working pressure of the safety mechanism in accordance with the wall thickness of the easily-rupturable portion 12. By contrast, in a case of forming a groove having a substantially U-shaped section by press working or other technique, corner portions at both widthwise ends of the groove bottom surface tend to rupture easily. Consequently, the working pressure of the safety mechanism cannot be kept constant. The cutting groove 10 has its both lengthwise end portions made smaller in width than the other portion thereof. Thus, the location of the easily-rupturable portion 12, provided in the groove bottom portion of the cutting groove 10, is confined to the lengthwise central part of the cutting groove 10.

Note that, in this description, the above described embodiment exemplifies the safety mechanism constituted by a single cutting groove 10 provided in the vicinity of the upper edge of the elongated side surface 1a of the battery case 1. However, even if the safety mechanism is alternatively constituted by any of cutting grooves 11, 15, and 16 as indicated by dash-dot-dot lines in FIG. 1, substantially the same effects as described above are achieved. Specifically, the cutting groove 11 is provided in the vicinity of the lower edge of the elongated side surface 1a in parallel with the upper and lower edges thereof; the cutting groove 15 is provided in the vicinity of the left-hand side edge of the elongated side surface 1a in parallel with both side edges thereof; and the cutting groove 16 is provided in the vicinity of the right-hand side edge of the elongated side surface 1a in parallel with both side edges thereof.

That is, in the elongated side surface 1a, the cutting grooves 11, 15, and 16, likewise to the cutting groove 10, are each formed in the boundary portion between an expanded area and a barely-expanded area, i.e. one of the portions that undergo the biggest stress-induced change. It is needless to say, however, that, to achieve the effects described above, the cutting grooves 11, 15, and 16 need to have a similar configuration to that of the cutting groove 10, and need to be respectively formed in one of three vertically-divided portions of the elongated side surface 1a that is closest to the lower edge thereof, in one of three horizontally-divided portions of the elongated side surface 1a that is closest to the left-hand side edge thereof, and in one of three horizontally-divided portions of the elongated side surface 1a that is closest to the right-hand side edge thereof.

Next, a description will be given below as to the safety mechanism according to a second embodiment of the present invention. As shown in FIG. 1, the safety mechanism of this embodiment is composed of a cutting groove 10 similar to that constituting the safety mechanism of the first embodiment, and a cutting groove 25 which is formed between the cutting groove 10 and the upper edge of the elongated side surface 1a in parallel with the cutting groove 10. In this safety mechanism, as in the first embodiment, an easily-rupturable portion 12 is provided between the groove bottom portion of the cutting groove 10 and the inner surface of the battery case 1. The cutting groove 25 has substantially the same configuration as that of the cutting groove 10, except that, in the former, a remaining wall thickness between the groove bottom portion and the inner surface of the battery case 1 is not secured for constituting the easily-rupturable portion. That is, the cutting groove 25 is provided for the purpose of facilitating the rupture of the easily-rupturable portion 12 of the cutting groove 10.

FIGS. 4A to 4C are sectional right-hand side views of the safety mechanism of the second embodiment of which each is a sectional view taken along the line IIC—IIC of FIG. 1, illustrating how the easily-rupturable portion 12 is ruptured with a rise in the battery internal pressure step by step. Now, with reference to FIGS. 4A to 4C, the working of the safety mechanism of this embodiment will be described below. FIG. 4A is a sectional view showing the configurations of the two cutting grooves 10 and 25 under a normal battery internal pressure. A working pressure for rupturing the easily-rupturable portion 12 is set in accordance with a wall thickness d of the easily-rupturable portion 12. When the prismatic battery in use is overcharged or suffers from a short circuit due to wrong use, gas is generated and fills inside the battery case 1, resulting in a rise in the battery internal pressure. Consequently, the battery case 1 is expanded outwardly as shown in FIG. 4B.

At that time, as shown in FIG. 4B explicitly, the cutting groove 25, formed above the cutting groove 10 in the elongated side surface 1a, that is, formed in the region less susceptible to deformation due to a rise in the battery internal pressure, is so deformed that its opposed groove wall surfaces come closer to each other, and consequently the part of the elongated side surface 1a in which the cutting groove 25 is formed is bent inwardly. The cutting groove 10, formed in the region of the elongated side surface 1a that is most susceptible to deformation due to a rise in the battery internal pressure, is so deformed that its groove opening is widely opened because of the inward bending of the elongated side surface 1a caused by the deformation of the cutting groove 25 described above, thereby facilitating the rupture. Then, at the instant when the battery internal pressure rises to a predetermined working pressure level, as shown in FIG. 4C, the easily-rupturable portion 12 is ruptured, thereby creating an opening. Through the resultant opening, the gas trapped inside the battery case 1 is discharged to the outside.

In this safety mechanism, various effects as explained in the first embodiment are achieved. In addition, the cutting groove 25, formed parallely in close proximity to the cutting groove 10 having the easily-rupturable portion 12, serves to facilitate the rupture of the easily-rupturable portion 12 by causing the groove opening of the cutting groove 10 to be opened at a greater angle while being deformed. This makes it possible to set the wall thickness d of the easily-rupturable portion 12, involved in the setting of the working pressure, to be larger than in the case of providing the cutting groove 10 alone, just as with the first embodiment. As a result, the accuracy of the wall thickness is controlled more easily, so that the workability of the cutting grooves 10 and 25, as well as the resistance to falling of the easily-rupturable portion 12, is enhanced. For example, whereas, in the battery case 1 having a single cutting groove formed in its bottom surface 1b, the easily-rupturable portion designed to be ruptured at 1 atmospheric pressure needs to be given a wall thickness of 1 $\mu$m, in the battery case 1 having a pair of cutting grooves 10 and 25 formed in its elongated side surface 1a in proximate relation, the easily-rupturable portion 12 designed to be ruptured at 1 atmospheric pressure is allowed to have a wall thickness of 10 $\mu$m. The larger the wall thickness, the easier the control of the wall thickness accuracy of the easily-rupturable portion 12 is.

Note that, in this description, the second embodiment exemplifies the safety mechanism constituted by a pair of cutting grooves 10 and 25 provided in the vicinity of the upper edge of the elongated side surface 1a. However, even if the safety mechanism is alternatively constituted by any of a pair of the cutting groove 11 shown in FIG. 1 and a cutting groove provided between the groove 11 and the lower edge of the elongated side surface 1a, a pair of the cutting groove 15 shown in FIG. 1 and a cutting groove provided between the groove 15 and the left-hand side edge of the side surface 1a, and a pair of the cutting groove 16 shown in FIG. 1 and a cutting groove provided between the groove 16 and the right-hand side edge of the side surface 1a, substantially the same effects as achieved in the second embodiment are achieved.

Next, a description will be given below as to a method of manufacturing a prismatic battery safety mechanism according to the present invention, for manufacturing the safety mechanism of the second embodiment. FIGS. 5A and 5B are respectively a front view and a right-hand side view illustrating a cutting apparatus 29 for use in the above-described manufacturing method. The cutting apparatus 29 is composed of a high-speed rotary body 30 having two pairs of identical cutting blades 37 (four pieces in total) attached thereto. The high-speed rotary body 30 is constructed by fixing two fitting blocks 32 and 33 stacked on top of each other to a lower-end portion of a rotary shaft 31 with fixing screws 34. The cutting blades 37 are each formed of a high hardness material, for example, a diamond, and provided with a balancer 38 having a predetermined weight. The pairs of the cutting blades 37 are respectively used for cutting work to obtain the cutting grooves 10 and 25 of the above-described safety mechanism, and are attached so as to be identically located on the track of the rotating high-speed rotary body 30. The high-speed rotary body 30 drives the cutting blade 37 of 100 mm in diameter, for example, to rotate at 3000 rpm or above.

Figure 6:
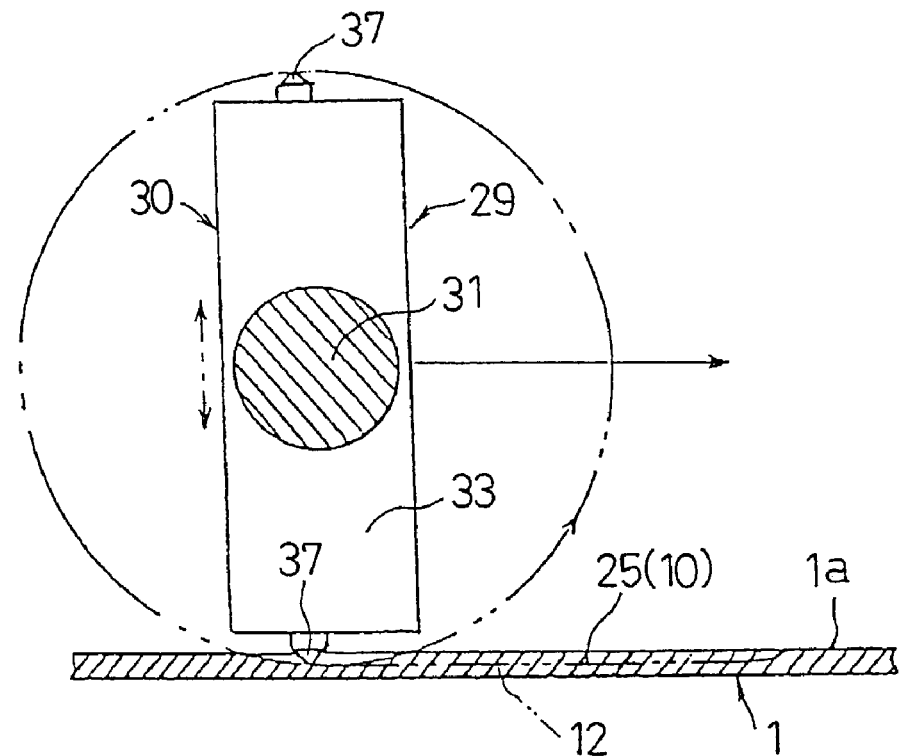
FIG. 6 is a sectional plan view illustrating a state in which a cutting groove is formed by means of the cutting apparatus.

FIG. 6 is a sectional plan view illustrating a state in which the two cutting grooves 10 and 25 are produced concurrently by means of the cutting apparatus 29. After the prismatic battery shown in FIG. 3 is fabricated by sealing the opening 14 of the battery case 1 with the sealing plate 17, the cutting grooves 10 and 25 are produced by processing the elongated side surface 1a of the battery case 1 of the prismatic battery in finished form. In this way, accidental intrusion of dust or dirt into the battery case 1 is successfully prevented during the formation of the cutting grooves 10 and 25.

The working process for the cutting grooves 10 and 25 is carried out as follows. First, by the action of the high-speed rotary body 30, the cutting blade 37 rotating at a high speed is brought into cutting engagement with the elongated side surface 1a of the battery case 1 until it reaches such a depth as to form the easily-rupturable portion 12 of the predetermined wall thickness d and is then fixed. Subsequently, as indicated by an arrow, the high-speed rotary body 30 is moved rectilinearly along a direction parallel to the upper and lower edges of the battery case 1 to rotate a pair of the cutting blades 37 a number of times. Consequently, the two cutting grooves 10 and 25 are formed concurrently on the elongated side surface 1a. Note that it is also possible to drive the high-speed rotary body 30 to rotate at a high speed in a fixed position and to move the battery case 1 rectilinearly with respect to the high-speed rotary body 30.

As described thus far, the cutting grooves 10 and 25 are formed by performing cutting work a number of times using the cutting blade 37 rotating at a high speed, just as if cutting into the elongated side surface 1a using a planer. Thus, the parts of the elongated side surface 1a in which the cutting grooves 10 and 25 are formed are protected from work hardening resulting from thermal stress. Consequently, in the easily-rupturable portion 12 provided by using the remaining wall thickness of the groove bottom portion of the cutting groove 10, its wall thickness d is controlled with high accuracy in terms of micron. Moreover, it never occurs that the sealing plate 17 is opened with respect to the opening 14 of the battery case 1 because of stress resulting from the flow of the material during the working. Further, the cutting grooves 10 and 25 are produced by rectilinearly moving the high-speed rotary body 30, to which the cutting blades 37 are attached, along the elongated side surface 1a. Thus, as shown in FIG. 2A, the cutting groove 10 is formed with high accuracy in such a way that its sectional profile is composed of a combination of the linear groove bottom portion 10a extending rectilinearly at an identical groove depth, and the two curved groove bottom portions 10b and 10c extending curvedly from both ends of the linear groove bottom portion 10a toward the outer surface of the battery case 1. Note that the cutting groove 25 is so configured as to be similar in sectional profile to the cutting groove 10.

Moreover, the safety mechanism of the first embodiment constituted by a single cutting groove 10 (or one of the other cutting grooves 11, 15, and 16) is manufactured basically in the same manner as in the above-described embodiment except that, in the former, in the cutting apparatus 29 shown in FIGS. 5A, 5B, and 6, one of the two pairs of four identical cutting blades 37 is removed. In this case, substantially the same effects as achieved in the above-described embodiment are achieved.

Further, in the manufacturing method of the above-described embodiment, after the prismatic battery is fabricated by sealing the opening 14 of the battery case 1 with the sealing plate 17, the single cutting groove 10 or the pair of cutting grooves 10 and 25 are formed on the elongated side surface 1a of the battery case 1 of the prismatic battery in finished form. However, the single cutting groove 10 or the pair of cutting grooves 10 and 25 may also be formed beforehand, by using the cutting apparatus 29, on the elongated side surface 1a of the battery case 1 which still remains as an independent body. In this case, if the cutting groove 10 or 25 suffers from a failure, the battery case 1 can be removed as being defective, and only the battery case 1 of good quality is allowed to be subjected to the battery manufacturing process. This enhances the yields of the battery. Moreover, the manufacturing cost is reduced, because discarding the battery case as being defective is less costly than discarding the prismatic battery as being defective.

Figure 7:
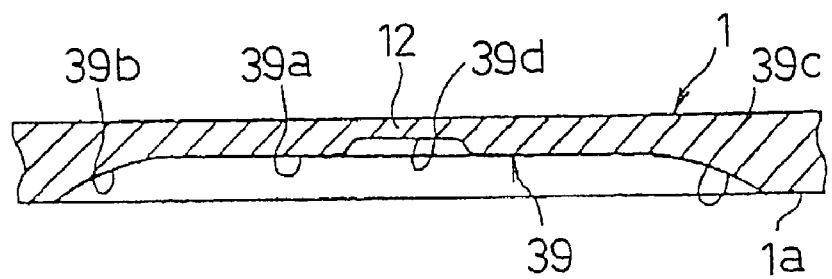
FIG. 7 is a cross-sectional view of the prismatic battery safety mechanism according to a third embodiment of the invention, illustrating the principal portion thereof.
Figure 8:
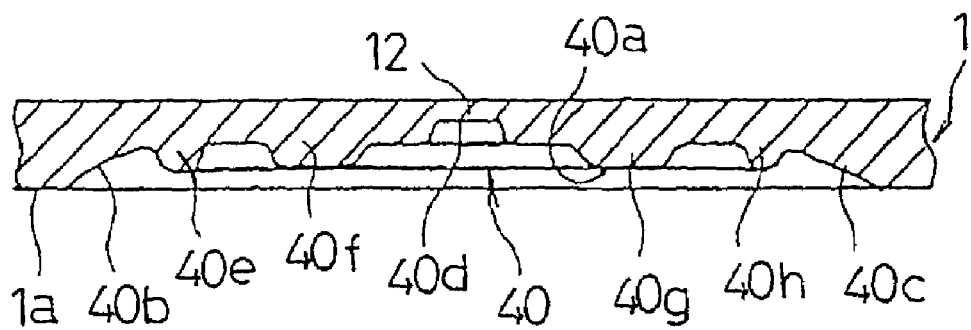
FIG. 8 is a cross-sectional view of the prismatic battery safety mechanism according to a fourth embodiment of the invention, illustrating the principal portion thereof.

FIGS. 7 and 8 are cross-sectional views of the prismatic battery safety mechanisms according to third and fourth embodiments, illustrating the principal portions thereof. As shown in FIG. 7, a cutting groove 39 constituting the safety mechanism of the third embodiment, likewise to the cutting groove 10 of the first embodiment, has its lengthwise sectional profile composed of a combination of a linear groove bottom portion 39a extending rectilinearly at an identical groove depth, and two curved groove bottom portions 39b and 39c extending curvedly from both ends of the linear groove bottom portion 39a toward the outer surface of the battery case 1. In addition, in the central part of the linear groove bottom portion 39a is provided a deepest groove bottom portion 39d having the deepest groove bottom. In this embodiment, the easily-rupturable portion 12 is provided by using a remaining wall thickness between a groove bottom surface of the deepest groove bottom portion 39d and the inner surface of the battery case 1.

In the safety mechanism constituted by the cutting groove 39, it is possible to achieve substantially the same effects as achieved in the safety mechanism of the first embodiment constituted by the cutting groove 10. In addition, since the easily-rupturable portion 12 is provided in a specified region opposing the small-area deepest groove bottom portion 39d of the cutting groove 39, the setting of the working pressure is made more easily and more accurately. Further, since the portion to be ruptured is limited to a specific small portion, a significantly improved level of safety is ensured in the battery during the operation of the safety mechanism.

As shown in FIG. 8, a cutting groove 40 constituting the safety mechanism of the fourth embodiment has its lengthwise sectional profile composed of a combination of a discontinuous groove bottom portion 40a whose groove bottom depth varies discontinuously, and two curved groove bottom portions 40b and 40c extending curvedly from both ends of the discontinuous groove bottom portion 40a toward the outer surface of the battery case 1. Moreover, in the central part of the discontinuous groove bottom portion 40a is provided a deepest groove bottom portion 40d having the deepest groove bottom. In this embodiment, the easily-rupturable portion 12 is provided by using a remaining wall thickness between a groove bottom surface of the deepest groove bottom portion 40d and the inner surface of the battery case 1.

In the safety mechanism constituted by the cutting groove 40, it is possible to achieve substantially the same effects as achieved in the safety mechanism constituted by the cutting groove 39 described above. In addition, a plurality of rib-shaped portions 40e to 40h, formed in the discontinuous groove bottom portion 40a so as to protrude from the groove bottom surface into the groove, serve to improve the resistance to falling of the battery. This prevents the easily-rupturable portion 12 from being ruptured easily due to a shock caused by the fall of an equipment incorporating the battery.

Note that the cutting grooves 39 and 40 are processed into a predetermined shape with high accuracy in the following manner. During the elongated side surface 1a of the battery case 1 is subjected to cutting using the cutting blade 37 that is attached to the high-speed rotary body 30 shown in FIG. 6 so as to rotate at high speed, the high-speed rotary body 30 is moved rectilinearly along the prismatic battery, and, as indicated by an arrow defined by a dash-dot-dot line in the figure, the cutting blade 37 is displaced by a predetermined distance at a predetermined timing, in a direction in which it is moved toward and away from the prismatic battery, in accordance with an NC control.

Figure 9:
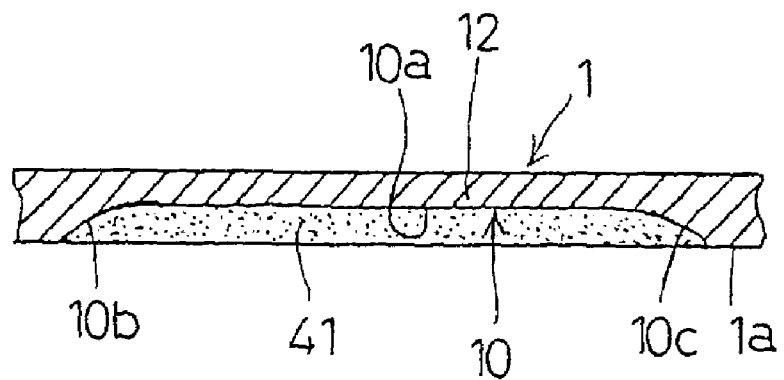
FIG. 9 is a cross-sectional view of the prismatic battery safety mechanism according to a fifth embodiment of the invention, illustrating the principal portion thereof.

FIG. 9 is a cross-sectional view of the safety mechanism according to a fifth embodiment of the present invention, illustrating the principal portion thereof. In the figure, the components that play the same or corresponding roles as in FIG. 2B are identified with the same reference symbols, and overlapping descriptions will be omitted. In this embodiment, a cutting groove 10, which is similar to that of the first embodiment, is filled up with fluorine resin or polyolefin resin so as to create a protective coating film 41. In general, the battery case 1 is protected by an oxide film formed thereon. However, this oxide film is removed concurrently with the cutting work for forming the cutting groove 10 on the elongated side surface 1a of the battery case 1. Consequently, the cutting groove 10 is susceptible to corrosion due to the leakage of electrolyte or salt water produced when the electrolyte is poured through the inlet hole 18 shown in FIG. 3. Such a problem is solved by employing the protective coating film 41 formed in this embodiment. Note that, in this description, this embodiment deals with a case where the protective coating film 41 is created within the cutting groove 10 formed in the first embodiment. It is needless to say, however, that a similar protective coating film 41 may be created in any of the cutting grooves 11, 15, 16, 25, 39, and 40 shown in the other embodiments.

Figure 10:
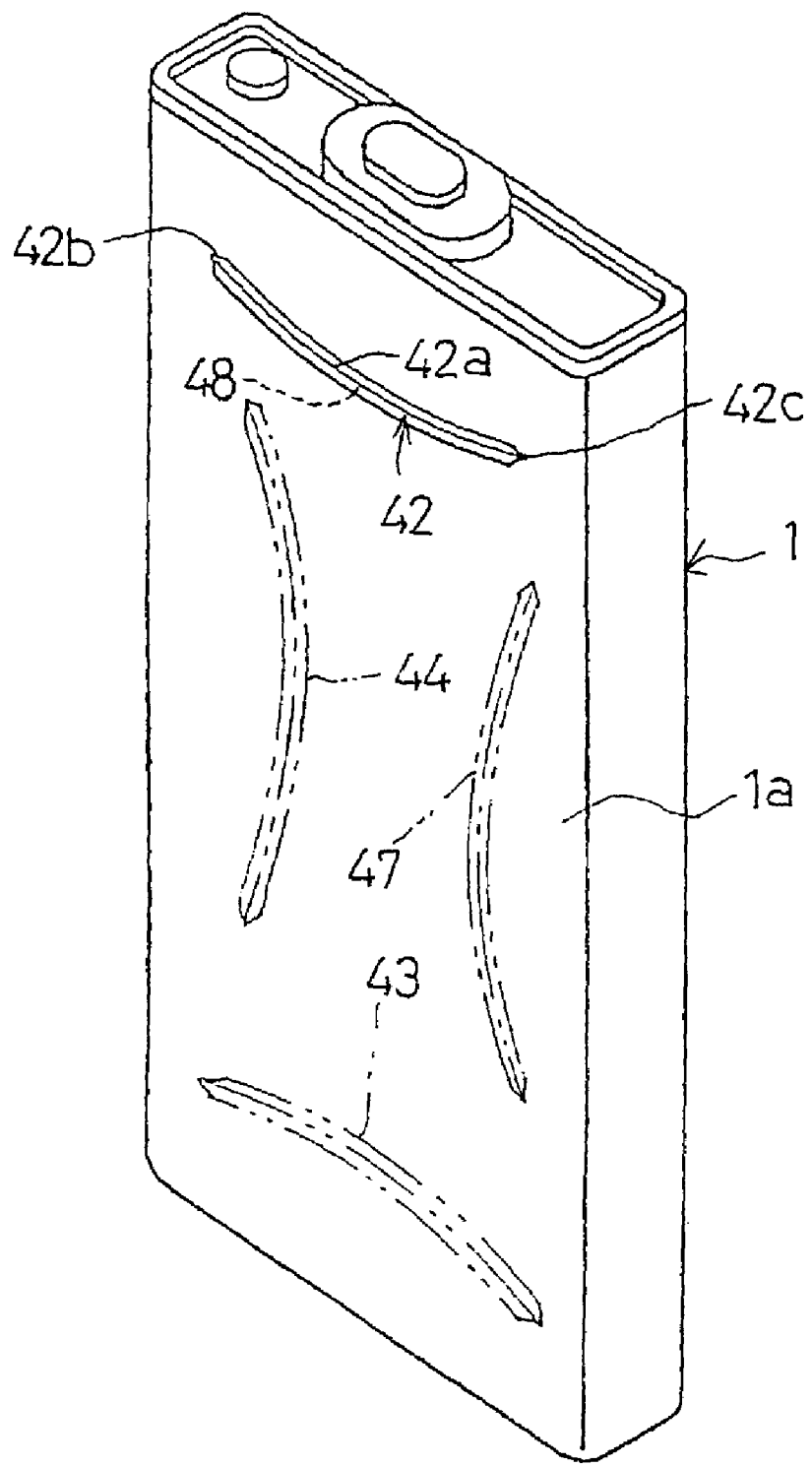
FIG. 10 is a perspective view illustrating a prismatic battery furnished with the safety mechanism according to a sixth embodiment of the invention.

FIG. 10 is a perspective view illustrating a prismatic battery furnished with the safety mechanism according to a sixth embodiment of the present invention. In this embodiment, a rectangular prism-shaped battery case 1 has a single, arc-shaped cutting groove 42 formed on one of elongated side surfaces 1a thereof. Likewise to the first embodiment, the cutting groove 42 is formed in one of three vertically-divided portions of the elongated side surface 1a that is closest to the upper edge. The cutting groove 42, like the cutting groove 10 of the first embodiment, has a substantially V-shaped section when viewed in a width direction perpendicular to its length direction. Moreover, its lengthwise sectional profile is composed of a combination of a linear groove bottom portion 42a extending rectilinearly at an identical groove depth, and two curved groove bottom portions 42b and 42c extending curvedly from both ends of the linear groove bottom portion 42a toward the outer surface of the elongated side surface 1a of the battery case 1. Between a groove bottom of the linear groove bottom portion 42a and the inner surface of the battery case 1 is provided a thin-walled easily-rupturable portion 48 having a thickness which is so set that the easily-rupturable portion 48 is ruptured at an instant when the internal pressure of the battery case 1 rises to a predetermined value.

In the safety mechanism constituted by the cutting groove 42, it is possible to achieve substantially the same various effects as achieved in the-safety mechanism of the first embodiment constituted by the cutting groove 10. In addition, the cutting groove 42 is continuously worked on, using a rotary-type cutting machine, by rotating a rotary cutter on a plane parallel to the elongated side surface 1a of the battery case 1. Thus, this safety mechanism provides significantly improved productivity for practical use.

Note that, in this description, the above-described embodiment exemplifies the safety mechanism constituted by the single cutting groove 42 provided in the vicinity of the upper edge of the elongated side surface 1a of the battery case 1. However, even if the safety mechanism is alternatively constituted by any of arc-shaped cutting grooves 43, 44, and 47 as indicated by dash-dot-dot lines in FIG. 10, various similar effects are achieved. Specifically, the cutting groove 43 is provided in the vicinity of the lower edge of the elongated side surface 1a; the cutting groove 44 is provided in the vicinity of the left-hand side edge of the side surface 1a; and the cutting groove 47 is provided in the vicinity of the right-hand side edge of the side surface 1a.

INDUSTRIAL APPLICABILITY

As described heretofore, in a prismatic battery safety mechanism according to the present invention, an easily-rupturable portion, provided by using a remaining wall thickness of a cutting groove's groove bottom portion, is formed on an elongated side surface, i.e. a wider-area portion, of a battery case that is deformed greatly with a rise in a battery internal pressure. This allows the easily-rupturable portion to be ruptured properly and swiftly at an instant when the battery internal pressure reaches a predetermined working pressure level. Moreover, the cutting groove is formed by cutting work and is thus free from work hardening resulting from thermal stress during the working. Thus, the physical properties of the periphery of the cutting groove remain unchanged. Consequently, the working pressure of the safety mechanism, which is set in accordance with the wall thickness of the easily-rupturable portion, is controlled with high accuracy.

Further, according to another aspect of the invention, in a method of manufacturing a prismatic battery safety mechanism, the cutting groove is formed in the elongated side surface of the battery case in finished form. This prevents accidental intrusion of dust or dirt produced during the formation of the cutting groove into the battery case. Since the cutting groove is formed by performing cutting work a number of times using a cutting blade rotating at a high speed, occurrence of work hardening due to thermal stress is prevented during the working. Consequently, the working pressure of the safety mechanism, which is set in accordance with the wall thickness of the easily-rupturable portion, is controlled with high accuracy.

What is claimed is:

1. A prismatic battery safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, comprising:

a cutting groove formed on an elongated side surface of the battery case, the cutting groove having a lengthwise center portion and opposing lengthwise end portions, each portion having a width and a depth, the width and depth of the end portions being smaller than the width and depth of the center portion; and rupturable portion provided between a groove bottom surface of the cutting groove and an inner surface of the battery case, the rupturable portion having a strength which is so set that the rupturable portion is ruptured at an instant when an internal pressure of the battery case rises to a predetermined value.

2. The prismatic battery safety mechanism according to claim 1, wherein the cutting groove is formed on the elongated side surface so as to be arranged parallel to one of an upper edge, lower edge, right-hand side edge, and left-hand side edge of the battery case.

3. The prismatic battery safety mechanism according to claim 2, wherein, in the battery case, the cutting groove is formed in one of three vertically-divided portions of the elongated side surface that is closest to the upper or lower edge, or formed in one of three horizontally-divided portions of the elongated side surface that is closest to the right-hand or left-hand side edge.

4. The prismatic battery safety mechanism according to claim 1, wherein a plurality of cutting grooves are formed on the elongated side surface so as to be arranged parallel to and proximate one another.

5. The prismatic battery safety mechanism according to claim 1, wherein the cutting groove has a substantially V-shaped section when viewed in a width direction perpendicular to its length direction.

6. A prismatic battery safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, comprising:

a cutting groove formed on an elongated side surface of the battery case, the cutting groove having a lengthwise center portion and opposing lengthwise end portions, each portion having a width and a depth, the width and depth of the end portions being smaller than the width and depth of the center portion;

the cutting groove having its lengthwise sectional profile composed of a combination of a linear groove bottom portion extending rectilinearly at an identical depth, and two curved groove bottom portions extending curvedly from both ends of the linear groove bottom portion toward an outer surface of the battery case, the linear groove bottom portion having a thin-walled rupturable portion provided between its groove bottom and an inner surface of the battery case, the rupturable portion having a strength which is so set that the rupturable portion is ruptured at an instant when an internal pressure of the battery case rises to a predetermined value.

7. A prismatic battery safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, by comprising:

a cutting groove formed on an elongated side surface of the battery case, the cutting groove having its lengthwise sectional profile composed of a combination of a discontinuous groove bottom portion whose groove bottom depth varies discontinuously, and two curved groove bottom portions extending curvedly from both ends of the discontinuous groove bottom portion toward an outer surface of the battery case, the discontinuous groove bottom portion having a rupturable portion provided between its groove bottom and an inner surface of the battery case, the rupturable portion having a strength which is so set that the rupturable portion is ruptured at an instant when an internal pressure of the battery case rises to a predetermined value.

8. The prismatic battery safety mechanism according to claim 6 or 7, wherein the cutting groove has, in its certain part, a deepest groove bottom portion having a deepest groove bottom, and the easily-rupturable portion is formed between a groove bottom surface of the deepest groove bottom portion and the inner surface of the battery case.

9. A prismatic battery safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, comprising:

a cutting groove formed on an elongated side surface of the battery case; and a rupturable portion provided between a groove bottom surface of the cutting groove and an inner surface of the battery case, the rupturable portion having a strength which is so set that the rupturable portion is ruptured at an instant when an internal pressure of the battery case rises to a predetermined value, wherein the cutting groove is filled up with fluorine resin or polyolefin resin so as to form a protective coating film for covering the entire cutting groove.

10. A prismatic battery safety mechanism that is incorporated in a prismatic battery having an electrode plate and electrolyte housed in a rectangular prism-shaped battery case, for performing degassing by opening a part of the battery case when a gas pressure inside the prismatic battery rises abnormally, comprising:

a cutting groove formed on an elongated side surface of the battery case, the cutting groove being arc-shaped, and having its lengthwise sectional profile composed of a combination of a linear groove bottom portion extending rectilinearly at an identical depth, and two curved groove bottom portions extending curvedly from both ends of the linear groove bottom portion toward an outer surface of the battery case, the linear groove bottom portion having a rupturable portion provided between its groove bottom and an inner surface of the battery case, the rupturable portion having a strength which is so set that the rupturable portion is ruptured at an instant when an internal pressure of the battery case rises to a predetermined value.

11. The prismatic battery safety mechanism according to claim 10, wherein the cutting groove is formed on the elongated side surface so as to be arranged parallel to one of an upper edge, lower edge, right-hand side edge, and left-hand side edge of the battery case.

12. The prismatic lithium rechargeable battery having the safety mechanism as set forth in claim 1 disposed on the elongated side surface of the battery case.

13. A method for manufacturing a prismatic battery safety mechanism, comprising:

fabricating a prismatic battery by housing an electrode plate and electrolyte in a battery case in a form of a rectangular prism having a bottom, and sealing an opening of the battery case; and forming a cutting groove on an elongated side surface of the battery case of the prismatic battery by bringing a cutting blade, which is attached to a high-speed rotary body so as to rotate at a high speed, into cutting engagement with the elongated side surface until it reaches such a depth as to form an rupturable portion having a predetermined wall thickness and is then fixed, and subsequently bringing the high-speed rotary body or the prismatic battery into rectilinear relative movement to rotate the cutting blade a number of times.

14. A method for manufacturing a prismatic battery safety mechanism, comprising:

fabricating a prismatic battery by housing an electrode plate and electrolyte in a battery case in a form of a rectangular prism having a bottom, and sealing an opening of the battery case; and forming a cutting groove of predetermined configuration whose groove depth varies discontinuously on an elongated side surface of the battery case of the prismatic battery by bringing a cutting blade, which is attached to a high-speed rotary body so as to rotate at a high speed, into cutting engagement with the elongated side surface, and subsequently bringing the high-speed rotary body or the prismatic battery into rectilinear relative movement and simultaneously bringing the high-speed rotary body or the prismatic battery into relative movement in a mutually approaching or departing direction to rotate the cutting blade a number of times.

15. The method for manufacturing a prismatic battery safety mechanism according to claim 13 or 14, wherein, instead of the step of forming the cutting groove on the battery case thereof after the prismatic battery is fabricated, the prismatic battery is manufactured in accordance with the steps of forming the cutting groove beforehand in the battery case, housing the electrode plate and electrolyte inside the battery case, and sealing the opening of the battery case.

16. The method for manufacturing a prismatic battery safety mechanism according to claim 13, wherein a plurality of cutting grooves are formed concurrently on the elongated side surface by bringing the high-speed rotary body having a plurality of cutting blades formed therein at predetermined intervals or the prismatic battery into relative movement in a linear direction perpendicular to a direction in which the cutting blades are arranged.

* * * * *

UNITED STATES PATENT AND TRADEMARK OFFICE
CERTIFICATE OF CORRECTION

PATENT NO. : 6,964,690 B2 Page 1 of 1
DATED : November 15, 2005
INVENTOR(S) : Yoshio Goda et al.

It is certified that error appears in the above-identified patent and that said Letters Patent is hereby corrected as shown below:

<u>Column 15,</u>
Lines 13 and 14, "thin-walled rupturable portion" should be changed to -- rupturable portion --.

Signed and Sealed this

Twenty-eighth Day of March, 2006

JON W. DUDAS
*Director of the United States Patent and Trademark Office*